(12) United States Patent
Davis

(10) Patent No.: US 8,432,294 B2
(45) Date of Patent: Apr. 30, 2013

(54) SUBSEA ELECTRONIC MODULE

(75) Inventor: Julian R. Davis, Bristol (GB)

(73) Assignee: Vetco Gray Controls Limited, Nailsea, Bristol (GB)

(*) Notice: Subject to any disclaimer, the term of this patent is extended or adjusted under 35 U.S.C. 154(b) by 0 days.

(21) Appl. No.: 13/356,992

(22) Filed: Jan. 24, 2012

(65) Prior Publication Data

US 2012/0120963 A1 May 17, 2012

Related U.S. Application Data

(62) Division of application No. 12/640,220, filed on Dec. 17, 2009.

(51) Int. Cl.
*G01V 3/00* (2006.01)

(52) U.S. Cl.
USPC ............... 340/855.3; 340/853.9; 340/854.8; 361/728

(58) Field of Classification Search ........... 340/853.2–3, 340/854.8, 855.1, 855.3; 175/26–27; 166/338, 166/54.6, 72, 318; 370/389; 174/68.1–68.3, 174/250; 361/715, 717, 720, 728, 735, 736; 330/66; 439/55–85
See application file for complete search history.

(56) References Cited

U.S. PATENT DOCUMENTS

| | | | | |
|---|---|---|---|---|
| 7,200,176 | B1 * | 4/2007 | Paulos et al. | 375/257 |
| 7,261,162 | B2 * | 8/2007 | Deans et al. | 166/336 |
| 7,468,894 | B2 * | 12/2008 | Bibee | 361/788 |
| 2003/0227347 | A1 | 12/2003 | Simon et al. | |
| 2007/0291535 | A1 | 12/2007 | Eberle et al. | |
| 2010/0127566 | A1 | 5/2010 | Biester et al. | |
| 2010/0202463 | A1 | 8/2010 | Robinson | |
| 2010/0220773 | A1 * | 9/2010 | Carter et al. | 375/222 |

FOREIGN PATENT DOCUMENTS

| | | | |
|---|---|---|---|
| DE | 4426908 B4 | | 2/1996 |
| EP | 1701384 A1 | | 9/2006 |
| GB | WO2008020152 | * | 2/2008 |
| WO | 0180443 A1 | | 10/2001 |

OTHER PUBLICATIONS

Search Report issued for GB0823009.6, dated Mar. 23, 2009.
Office Action from parent U.S. Appl. No. 12/640,220, dated Mar. 24, 2011.
Office Action from parent U.S. Appl. No. 12/640,220, dated Aug. 29, 2011.
Advisory Action from parent U.S. Appl. No. 12/640,220, dated Dec. 16, 2011.
ABB Offshore Systems, "Overview of Subsea Electronics Module (SEM) Capabilities," Lombito Tomboco Presentation, Jun. 3, 2003.

* cited by examiner

*Primary Examiner* — Albert Wong
(74) *Attorney, Agent, or Firm* — Bracewell & Giuliani LLP

(57) ABSTRACT

An electronic module for use as a subsea electronic module (SEM) for an underwater fluid extraction well, as provided. An example of such an SEM includes a plurality of substantially planar electronics cards to operate devices in the SEM. The cards are arranged in a stack such that major faces of each card are oriented substantially parallel to, and coaxial with, major faces of the other cards in the stack. The SEM also includes a substantially planar switch card orientated relative to the stack such that its major faces are oriented substantially parallel to a main axis of the stack and orthogonal to the orientation of the major faces of the electronics cards within the stack. The switch card includes a first Ethernet switch blade configured to control traffic on a LAN area network and a second Ethernet switch blade configured to control traffic on a second LAN.

21 Claims, 4 Drawing Sheets

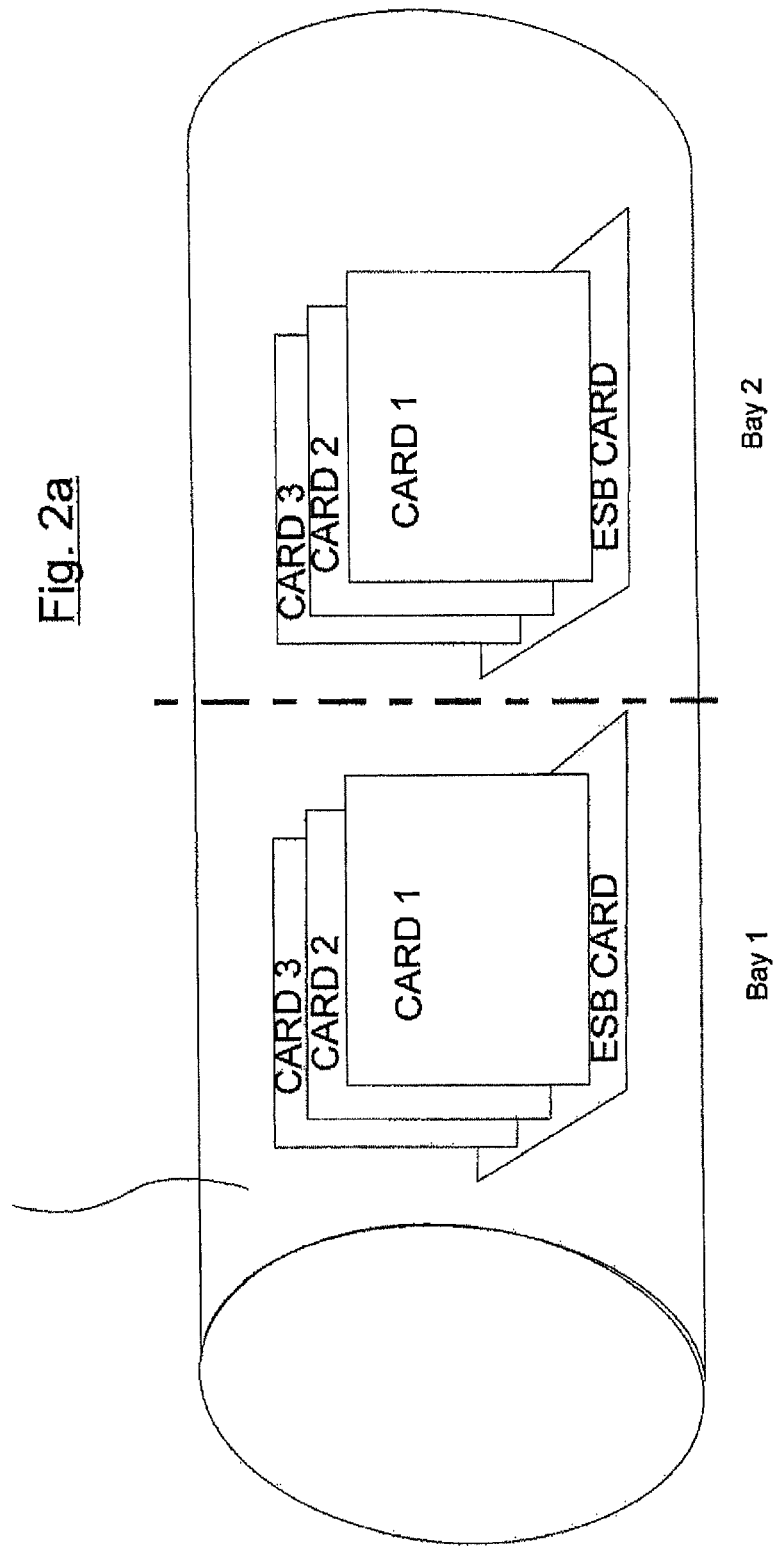

SUBSEA ELECTRONIC MODULE

RELATED APPLICATIONS

This application is a divisional application of and claims priority to and the benefit of U.S. patent application Ser. No. 12/640,220, filed on Dec. 17, 2009, which claims priority from United Kingdom Application 0823009.6, filed Dec. 18, 2008, each incorporated by reference in its entirety.

BACKGROUND OF THE INVENTION

1. Field of the Invention

This invention relates to electronic modules including subsea electronic modules for an underwater fluid extraction well, and methods of enabling Ethernet communication therefor.

2. Description of the Related Art

The control of an underwater fluid extraction well, such as a hydrocarbon extraction well, is typically managed by a subsea electronic module (SEM) housed in a subsea control module (SCM), itself mounted on a subsea "Xmas tree" located on the sea bed above the fluid extraction well. Existing SEMs contain a number of printed wiring boards or cards which perform dedicated functions, such as the operation of hydraulic directional control valves (DCVs). Communication to and from the SEM is enabled via a modem if there are copper links, or an equivalent optical modem if optical links are employed. Modern SEMs utilise Ethernet communication between the electronic cards, which requires Ethernet switches to be mounted on the circuit boards. Typically, the electronic cards are arranged in sets as a 'bay', with a number of bays within the SEM. Further Ethernet switches are required to enable communication between the bays. Consequently, a large number of interfaces is required between all the Ethernet components, which components typically include switch blades. These interfaces are conventionally effected by transformers. However, transformers are expensive and consume significant space on the SEM electronic cards, which limits the functions available in an SEM whose dimensions are strictly limited by well operator customers.

It is an aim of the present invention to remove the need for transformers as SEM Ethernet component interfaces. This aim is achieved by replacing the Ethernet component interface transformers with capacitive couplings, e.g. capacitances such as capacitors. Although the use of capacitors instead of transformers is a known technique, it is rarely employed in operations involving network communications, as there are severe restrictions on transmission distances compared to the transformer case. Thus, capacitive coupling is not generally a viable option in Ethernet systems, and so transformers are standard, including for SEMs.

However, in accordance with the present invention, capacitive coupling is made viable through re-organisation of the cards within an SEM to ensure that transmission distances are small. This brings about major benefits in terms of cost and weight reduction, as well as allowing the functional repertoire of the SEM to be increased.

SUMMARY OF THE INVENTION

In view of the foregoing, embodiments of the present invention advantageously provide electronic modules for use as a subsea electronic module for an underwater fluid extraction well, and methods of providing communication between components within subsea electronic modules for underwater fluid extraction wells.

In accordance with a first aspect of the present invention, there is provided an electronic module for use as a subsea electronic module for an underwater fluid extraction well, which includes a plurality of substantially planar electronics cards arranged in a stack such that major faces of each card are oriented substantially parallel to, and coaxial with major faces of the other cards in the stack, and a substantially planar switch card orientated relative to the stack such that its major faces are oriented substantially parallel to a main axis of the stack and orthogonal to the orientation of the major faces of the electronics cards within the stack and positioned such that the switch card is substantially equidistant from each electronics card within the stack.

According to an embodiment, the electronic module includes a housing having a longitudinal shape in the form of an elongate cylinder with a substantially circular cross-section. The main axis of the stack is configured to be either substantially parallel to a longitudinal axis of the housing of the module, or substantially orthogonal to a longitudinal axis of the housing of the module.

According to an embodiment, the switch card includes an Ethernet switch blade (ESB) card containing a pair of ESBs. The first of the pair of ESBs is configured to control traffic on a first local area network (LAN) and the second of the pair of ESBs is configured to control traffic on a second LAN. According to an embodiment, each electronics card includes a single board computer (SBC). Each SBC is configured to feed electrical drivers to operate devices in the module. Each SBC interfaces with both the first LAN and the second LAN. Each electronics card includes a first LAN port and a second LAN port. And the SBC of each electronics card is configured so that traffic received through the first LAN port is processed separately from traffic received through the second LAN port.

According to an embodiment, the electronics module includes a housing having a longitudinal shape, a plurality of card stacks arranged along a length of the housing of the module, and a respective one of a corresponding plurality of switch cards for each respective one of the plurality of card stacks.

According to an embodiment, the electronics module includes a plurality of bays containing a corresponding plurality of the electronics cards and a respective Ethernet switch including a plurality of Ethernet switch blades. Each Ethernet switch blade correspondingly includes a plurality of ports configured for receiving traffic from a corresponding plurality of ports for the respective associated plurality of electronics cards, and a plurality of additional ports configured for bay to bay connectivity.

In accordance with a second aspect of the present invention, there is provided an electronic module for use as a subsea electronic module for an underwater fluid extraction well, which includes a plurality of substantially planar electronics cards arranged in a stack such that major faces of each card are oriented substantially parallel to, and coaxial with major faces of the other cards in the stack. Electronics module also includes a substantially planar switch card orientated relative to the stack such that its major faces are oriented substantially parallel to a main axis of the stack and orthogonal to the orientation of the major faces of the electronics cards within the stack, the switch card comprising a first Ethernet switch blade configured to control traffic on a first local area network and a second Ethernet switch blade configured to control traffic on a second local area network.

According to an embodiment, each electronics card includes a single board computer (SBC), each SBC is configured to feed electrical drivers to operate devices in the module, each SBC interfaces with both the first LAN and the second LAN, each electronics card includes a first LAN port and a second LAN port, and the SBC of each electronics card is configured so that traffic received through the first LAN port is processed separately from traffic received through the second LAN port.

In accordance with a third aspect of the present invention, there is provided a method of providing communication between components within a subsea electronic module for an underwater fluid extraction well, which includes the steps of providing a plurality of substantially planar electronics cards adapted to control or operate devices in the subsea electronics module, and arranging the plurality of electronics cards in a stack such that major faces of each card are oriented substantially parallel to, and coaxial with, major faces of the other cards in the stack. The steps also include providing a substantially planar switch card a first Ethernet switch blade configured to control traffic on a first local area network and a second Ethernet switch blade configured to control traffic on a second local area network, orienting the switch card relative to the stack such that its major faces are oriented substantially parallel to a main axis of the stack and orthogonal to the orientation of the major faces of the electronics cards within the stack, managing and routing traffic on the first local area network using the first Ethernet switch blade, and managing and routing traffic on the second local area network using the second Ethernet switch blade.

According to an embodiment, each electronics card includes a single board computer (SBC), each SBC interfaces with both the first LAN and the second LAN, and each electronics card includes a first LAN port and a second LAN port. According to this embodiment, the steps further include processing traffic received through the first LAN port of each respective electronics card separately from traffic received through the second LAN port.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 2a schematically shows a physical arrangement of cards within an SEM in accordance with the present invention;

FIG. 2b schematically shows a cross-sectional view of the SEM of FIG. 2a; and

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Figure 1:
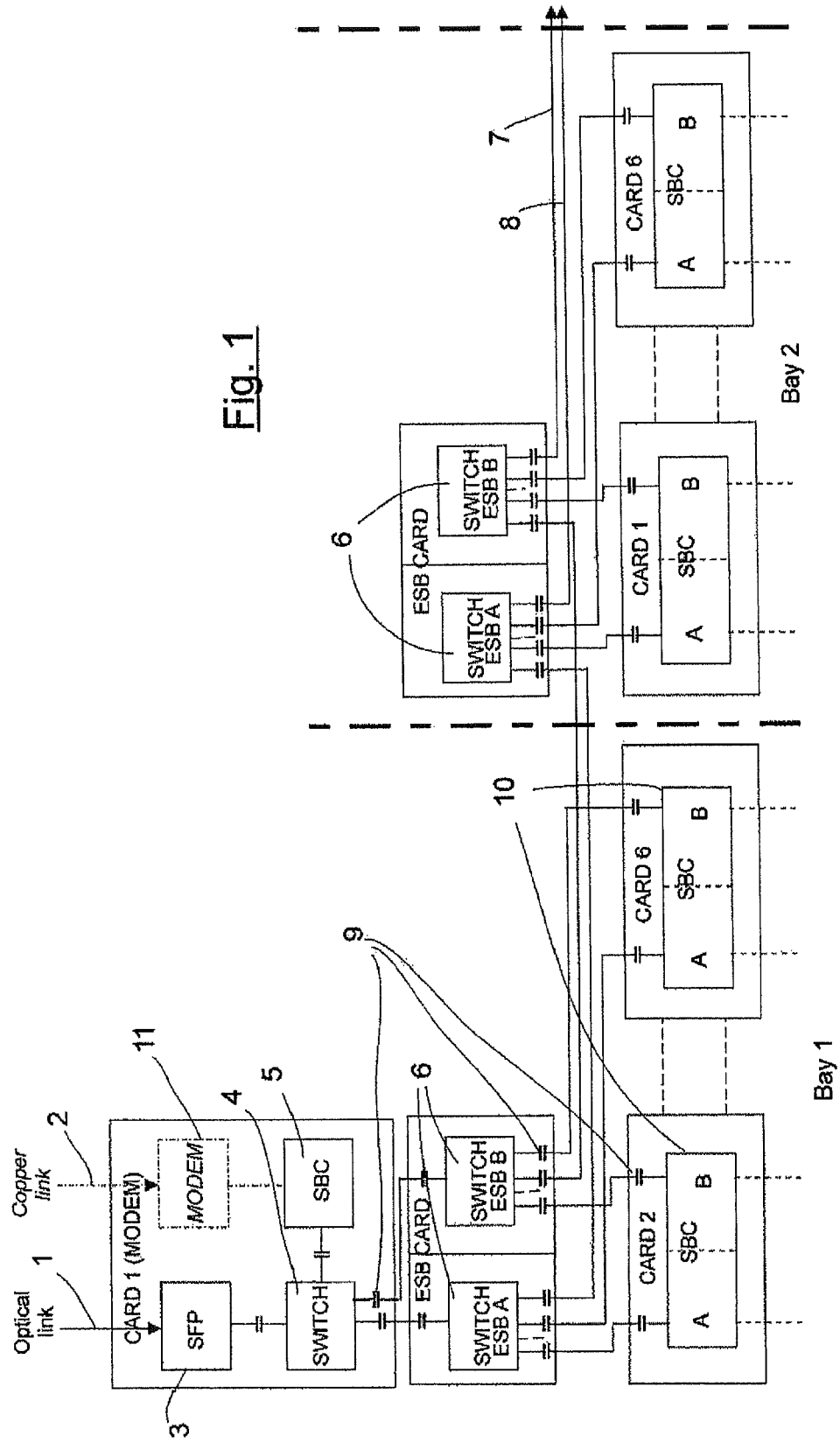
FIG. 1 schematically shows a subsea electronic module functionality in accordance with the present invention.

FIG. 1 shows an example of a configuration of an Ethernet communication system within a multi-card, multi-bay SEM, in accordance with the present invention. In FIG. 1, interfaces for both an optical external interface 1 and a copper external interface 2 to the well control platform are shown. In practice, only one interface would be used, as described below. The selection of optical or copper interfaces 1, 2 is made to enable the SEM to be compatible with the form of interface required for a particular installation. In both cases, the interface connects to a first card ("CARD 1") within the SEM, which comprises an Ethernet switch 4 capacitively coupled to a single board computer (SBC) 5.

If an optical interface 1 is used, this is connected to a small form-factor pluggable transceiver (SFP) 3, which acts as a media converter extending the topside LAN down to the SEM internal LAN(s) via an optical point to point Ethernet link, and thus provides an optical to electrical interface to the Ethernet switch 4. Modem 11 shown in FIG. 1 would not be present.

If however a copper interface 2 is used, this is connected via a modem 11 to the SBC 5. Here the SBC 5 supports the modem 11 and implements a bridge and interpreter/translator function for the modem communications.

SBC 5 is connected to Ethernet switch 4, and so may handle communications to and from either external interface 1 or 2. Ethernet switch 4 is a managed switch capable of implementing key level three protocol router functions including Spanning Tree Protocol (STP) to ensure that no LAN loops are created between the SEM internal LANs (A and B—see below) and traffic management including bandwidth assignment and prioritization.

The configuration of the SEM shown has a number of bays each with a stack of six electronic cards. In FIG. 1, only three cards (i.e. CARD 1, CARD 2 and CARD 6) are shown. In addition, only two bays of cards are shown for simplicity (i.e. Bay 1 and Bay 2), with extension of the system being provided by additional interfaces 7 and 8 for additional bays.

The SEM shown supports two internal LANs A and B, providing redundancy. Traffic on LANs A and B are routed and managed via switch 4. The LANs A and B are segregated to assure single point failure tolerance.

An ESB card of each bay includes a pair of Ethernet switch blades (ESBs) 6, denoted ESB A and ESB B, controlling LAN A and B traffic, respectively. Each ESB 6 is an un-managed eight-port Ethernet switch, with six ports assigned for connection to bay-mounted cards (i.e. CARD 1-CARD 6) and two ports assigned for bay to bay connectivity. In FIG. 1, Bay 2, only four ports are shown connected. The Ethernet switch blades (ESBs) 6 of each CARD 1 are arranged in a dual configuration to provide system redundancy. Each ESB card is located above and orthogonal to the respective stack of six cards of the bay, as shown in FIG. 2.

Each card (i.e. CARD 1-CARD 6) includes an SBC 10 which feeds electrical drivers to operate devices in the SEM, such as directional control valves (DCVs) and/or other electrical devices and also interface with monitoring sensors on the well tree. For simplicity, these drivers, devices and interfaces are not shown in FIG. 1. Each SBC 10 interfaces to both A and B function ESBs 6, and Ethernet ports A and B are processed separately within the SBC.

Capacitive coupling between the ESBs 6 and the SBCs 10 and switch 4 is enabled by a multiplicity of capacitances 9 provided on the respective cards.

Figure 2B:
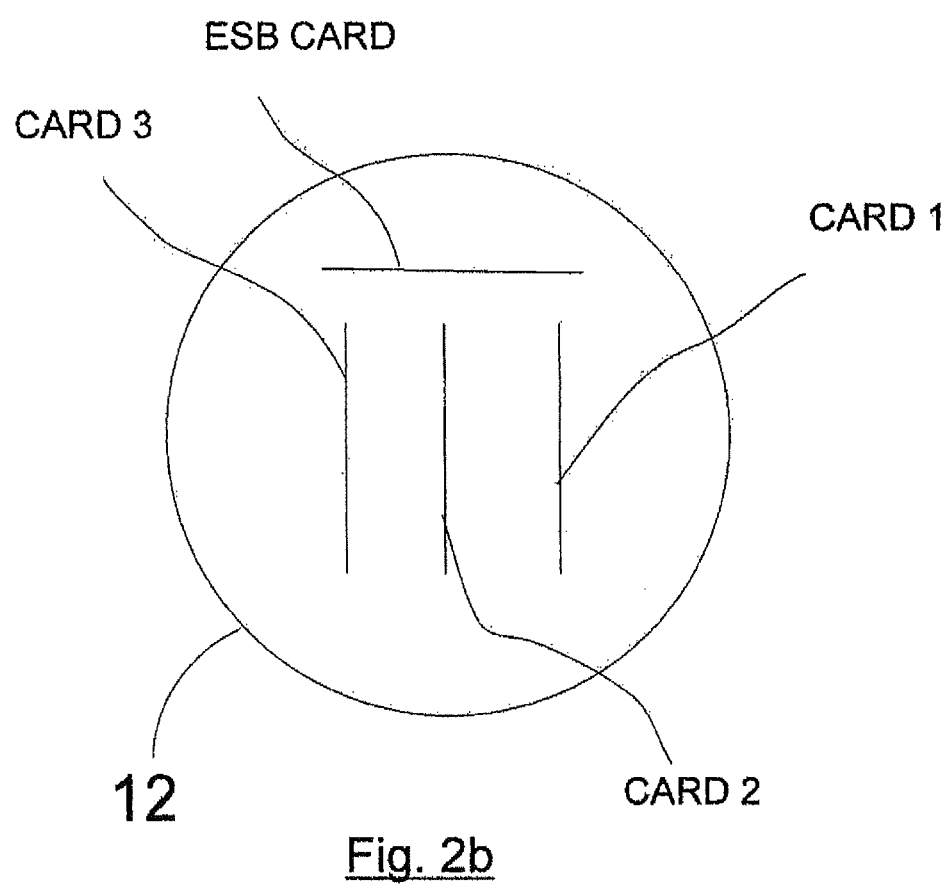

FIGS. 2a and 2b schematically shows the physical layout of cards within an SEM housing 12. For clarity, only three cards (i.e. "CARD 1" to "CARD 3") are shown in each bay's card stack.

As shown in FIGS. 2a and 2b, each electronics card is substantially planar, and in each of bays 1 and 2, CARD 1 to CARD 3 are arranged in a stack such that the major faces of each card are oriented substantially parallel to, and coaxial with, major faces of the other cards in the stack. The ESB card holding the ESB switch blades 6 is orientated relative to the stack such that its major faces are directed along an axis substantially parallel to the main axis of the stack (see FIG. 2a) and orthogonal to that of the major faces of the cards within the stack and positioned such that the ESB card is substantially equidistant from each card within the stack.

Figure 3:
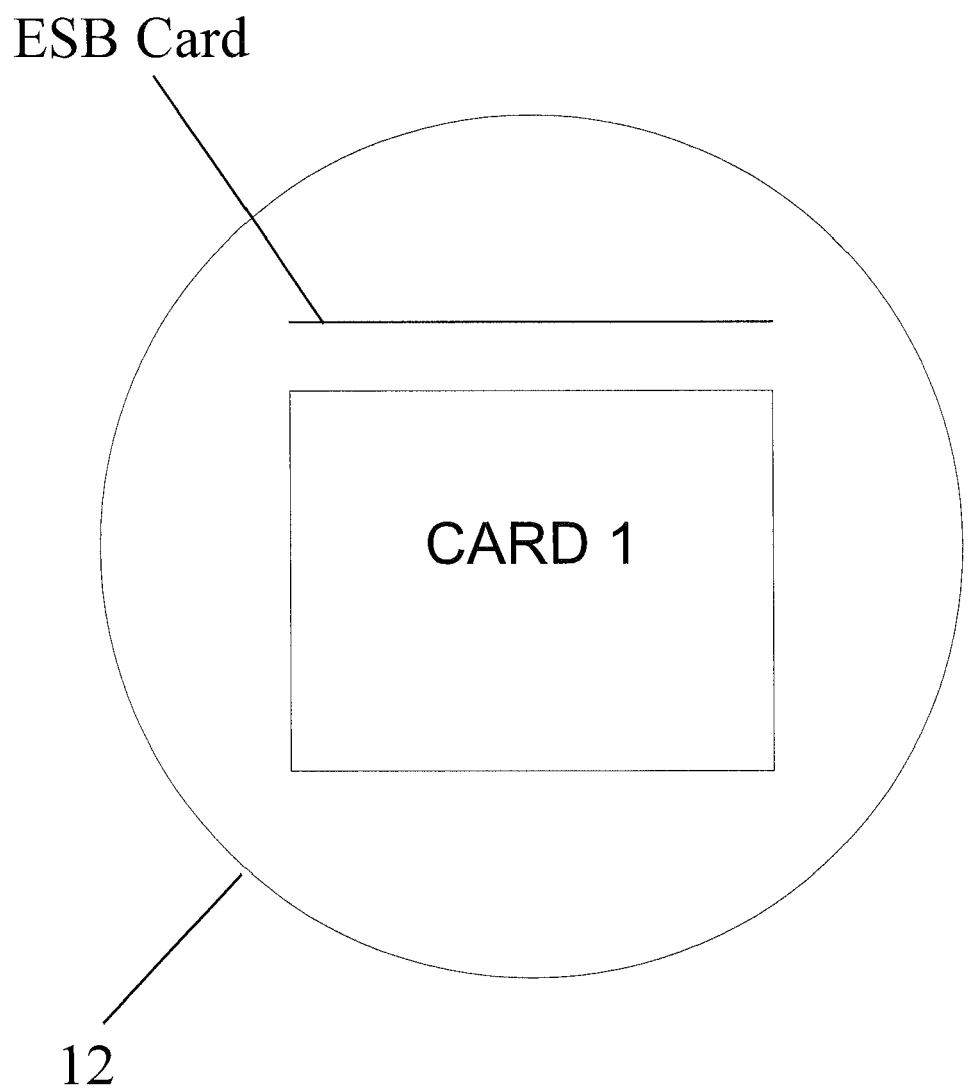
FIG. 3 schematically shows a cross-sectional view of the SEM of FIG. 2a according to an alternate embodiment of the present invention.

SEM housing 12 is formed as an elongate cylinder, with a substantially circular cross section. Each stack is arranged with its main axis orthogonal to the longitudinal axis of the SEM housing 12 (FIG. 2b). Each stack is alternatively arranged with its main axis substantially parallel to the longitudinal axis of the SEM housing 12 (FIG. 3).

As can be seen more clearly in FIG. 2b, each ESB card occupies a segment cross-section space that exists above or below the card stack when installed in the SEM housing 12.

Since the ESB cards sit above or below the respective card stacks, the distances between the ESB cards and the cards of each stack are minimized, so that capacitive coupling can be realised.

Positioning the ESB(s) above or below the card stack provides various benefits, including:
Segregation of the capacitively-coupled LAN from the standard SEM backplane to enhance EMC performance;
Reduction of the radiated and conducted susceptibility within the SEM;
Segregation of the SEM LAN(s) high speed digital lines from AC power lines and topside communications lines, and segregation of high current switching functions from sensitive analogue cables;
Restraining and minimizing of the LAN distribution and controlled impedance of printed tracks;
Maximizing use of the volume within the SEM enclosure;
Maximizing the SEM thermal management afforded to the ESB;
Facilitation of the implementation of thermal provisions to effectively export heat away from the switches (via conduction) and associated power converters to the SEM chassis via an ESB support ladder metalwork and coverplate metalwork. Effective thermal provisions are critical if the mean time to failure (MTTF) of the ESB function is to be optimized.

The above-described embodiment is exemplary only, and various modifications within the scope of the claims will be apparent to those skilled in the art.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

The invention claimed is:

1. An electronic module for use as a subsea electronic module for an underwater fluid extraction well, comprising
a first and a second local area network (LAN) to enable communication within the subsea electronic module;
a housing; and
one or more bays positioned within the housing, each of the one or more bays comprising:
a plurality of substantially planar electronics cards, the cards arranged in a stack such that major faces of each card are oriented substantially parallel to major faces of the other cards in the stack and such that a major axis of each card is oriented substantially parallel to major axes of the other cards in the stack,
a substantially planar Ethernet switch card orientated relative to the stack such that its major faces are oriented substantially parallel to a main axis of the stack and orthogonal to the orientation of the major faces of the electronics cards within the stack and positioned such that the Ethernet switch card is substantially equidistant from a distal end of each electronics card within the stack,
a first Ethernet switch located on the planar Ethernet switch card and capacitively coupled with each of the plurality of substantially planar electronics cards, and
a second Ethernet switch located on the planner electronics card and capacitively coupled with each of the plurality of substantially planer cards.

2. A module according to claim 1,
wherein the housing includes an elongate main body in the form of an elongate cylinder with a substantially circular cross-section receiving said Ethernet switch card and said plurality of planar electronics cards
wherein said Ethernet switch card is located in it space between said electronics cards and an inner surface of an elongate main body of said housing thereby minimizing distance between the Ethernet switch card and each of the plurality of electronics cards and providing enhanced thermal management; and
wherein the main axis of the stack is configured to one of the following profiles:
the main axis of the stack is substantially parallel to a longitudinal axis of the housing of the module; or
the main axis of the stack is substantially orthogonal to a longitudinal axis of the housing of the module.

3. A module according to claim 1, wherein first and the second Ethernet switches comprise a pair of Ethernet switch blades (ESBs), wherein the Ethernet switch card comprises an ESB card containing the pair of ESBs, the first of the pair of ESBs configured to control traffic on the first LAN and the second of the pair of ESBs configured to control traffic on the second LAN.

4. A module according to claim 3, wherein each electronics card includes a single board computer (SBC), wherein each SBC is configured to feed electrical drivers to operate devices in the module, wherein each SBC interfaces with both the first LAN and the second LAN, wherein each electronics card includes a first LAN port and a second LAN port, and wherein the SBC of each electronics card is configured so that traffic received through the first LAN port is processed separately from traffic received through the second LAN port.

5. A module according to claim 1, wherein the housing has a longitudinal shape, the module further comprising:
a plurality of card stacks arranged along a length of the housing of the module; and
a respective one of a corresponding plurality of Ethernet switch cards for each respective one of the plurality of card stacks.

6. A module according to claim 1, wherein the first and the second Ethernet switches comprise first and second ESBs, wherein the Ethernet switch card comprises an ESB card, and wherein each electronics card within the stack comprises a first Ethernet component and a first Ethernet interface for capacitively coupling with the first ESB on the ESB card, and a second Ethernet component and a second Ethernet interface for capacitively coupling with the second ESB on the ESB card.

7. A module according to claim 6, wherein each Ethernet interface of each of the plurality of electronics cards comprises a capacitive device providing capacitive coupling to the respective first or second ESB, wherein the ESB card includes a first plurality of capacitive devices being connected with the first ESB, providing capacitive coupling to a corresponding plurality of the electronics cards in the stack, and a second plurality of capacitive devices being connected with the second ESB, providing capacitive coupling to the corresponding plurality of electronics cards in the stack.

8. A module according to claim 5, wherein each Ethernet switch card comprises an Ethernet interface capacitively coupled with a different Ethernet switch card to provide connectivity between associated LAN components in each other of the plurality of card stacks.

9. A module according to claim 1, wherein the first Ethernet switch located on the planar Ethernet switch card is a first ESB, wherein the second Ethernet switch located on the planar Ethernet switch card is a second ESB, the module further comprising:
a plurality of bays each containing a plurality of electronics cards and a respective Ethernet switch card including a first and a second ESB;
wherein each ESB comprises a plurality of ports configured for receiving traffic from a corresponding plurality of ports for the respective associated plurality of electronics cards, and at least one additional port configured for bay to bay connectivity.

10. A module according to claim 1, further comprising:
a plurality of bays each containing a plurality of electronics cards, a respective Ethernet switch card, and a pair of Ethernet switches contained within the respective Ethernet switch card;
wherein each Ethernet switch of the pair of Ethernet switches within each respective one of the plurality of bays comprises a first port, a second port, and a plurality of additional ports;
wherein the first port of a first Ethernet switch of the pair of Ethernet switches of a first of the plurality of bays is coupled with a first Ethernet switch of the pair of Ethernet switches of a second of the plurality of bays to provide bay-to-bay connectivity of the first LAN;
wherein the second port of the first Ethernet switch of the pair of Ethernet switches of the first of the plurality of bays is coupled with a first Ethernet switch of the pair of Ethernet switches of a third of the plurality of bays to provide connectivity with the first LAN;
wherein each separate one of the plurality of additional ports of the first Ethernet switch of the pair of Ethernet switches of the first of the plurality of bays is coupled with a separate one of the plurality of electronics cards contained in the first of the plurality of bays to provide connectivity of the respective plurality of electronics cards with the first LAN; and
wherein each separate one of the plurality of additional ports of the second Ethernet switch of the pair of Ethernet switches of the first of the plurality of bays is coupled with a separate one of the plurality of electronics cards contained in the first of the plurality of bays to provide connectivity of the respective plurality of cards with the second LAN.

11. A subsea electronic module for use as a subsea electronic module for an underwater fluid extraction well, comprising:
a first and a second local area network (LAN) to enable communication within the subsea electronic module;
a housing; and
one or more bays positioned within the housing, each of the one or more bays comprising:
a plurality of substantially planar electronics cards, the cards arranged in a stack such that major faces of each card are oriented substantially parallel to, and coaxial with major faces of the other cards in the stack, and
a substantially planar ESB card orientated relative to the stack such that its major faces are oriented substantially parallel to a main axis of the stack and orthogonal to the orientation of the major faces of the electronics cards within the stack,
the ESB card comprising a first ESB configured to control traffic on the first LAN and the second ESB configured to control traffic on a second LAN,
each of the plurality of electronics cards comprising a first Ethernet component and a first Ethernet interface for capacitively coupling with the first ESB on the ESB card and a second Ethernet component and a second Ethernet interface capacitively coupled with the second ESB on the ESB card, and
the first and second Ethernet interfaces each providing a capacitive coupling to the respective first and second ESBs on the ESB card.

12. A module according to claim 11,
wherein the housing includes an elongate main body in the form of an elongate cylinder with a substantially circular cross-section receiving said ESB card;
wherein said ESB card is located in a space between said electronics cards and an inner surface of an elongate main body of said housing, thereby minimizing distance between the ESB card and each of the plurality of electronics cards; and
wherein the main axis of the stack is substantially parallel to a longitudinal axis of the housing of the module.

13. A module according to claim 11,
wherein the housing includes an elongate main body in the form of an elongate cylinder with a substantially circular cross-section receiving said ESB card;
wherein said ESB card is located in a space between said electronics cards and an inner surface of an elongate main body of said housing, thereby minimizing distance between the ESB card and each of the plurality of electronics cards; and
wherein the main axis stack is substantially orthogonal to a longitudinal axis of the housing of the module.

14. A module according to claim 11, wherein each electronics card includes a single board computer (SBC), wherein each SBC is configured to feed electrical drivers to operate devices in the module, wherein each SBC interfaces with both the first LAN and the second LAN, wherein the first Ethernet interface comprises a first LAN port, wherein the second Ethernet interface comprises a second LAN port, and wherein the SBC of each electronics card is configured so that traffic received through the first LAN port is processed separately from traffic received through the second LAN port.

15. A module according to claim 11, wherein the housing has a longitudinal shape, the module further comprising:
a plurality of card stacks arranged along a length of the housing of the module; and
a respective one of a corresponding plurality of ESB cards for each respective one of the plurality of stacks.

16. A module according to claim 11, further comprising:

a plurality of bays each containing a plurality of electronics cards and a respective ESB card including a plurality of ESB;

wherein each ESB comprises a plurality of ports configured for receiving traffic from a corresponding plurality of ports for the respective associated plurality of electronics cards, and a plurality of additional ports configured for bay to bay connectivity.

17. A module according to claim 11, wherein the one or more bays comprises a plurality of bays each containing a separate plurality of electronics cards, a respective ESB card, and a pair of ESBs contained within the respective ESB card;

wherein each ESB of the pair of ESBs within each respective one of the plurality of bays comprises a first port, a second port, and a plurality of additional ports;

wherein the first port of a first ESB of the pair of ESBs of a first of the plurality of bays is coupled with a first ESB of the pair of ESBs of a second of the plurality of bays to provide bay-to-bay connectivity of the first LAN;

wherein the second port of the first ESB of the pair of ESBs of the first of the plurality of bays is coupled with a first ESB of the pair of ESBs of a third of the plurality of bays to provide connectivity with the first LAN;

wherein each separate one of the plurality of additional ports of the first ESB of the pair of ESBs of the first of the plurality of bays is coupled with a separate one of the plurality of electronics cards contained in the first of the plurality of bays to provide connectivity of the respective plurality of electronics cards with the first LAN; and wherein each separate one of the plurality of additional ports of the second ESB of the pair of ESBs of the first of the plurality of bays is coupled with a separate one of the plurality of electronics cards contained in the first of the plurality of bays to provide connectivity of the respective plurality of cards with the second LAN.

18. A method of providing communication between components within a subsea electronic module for an underwater fluid extraction well, comprising the steps of:

providing a housing of a subsea electronics module, the housing including an elongate main body in the form of an elongate cylinder with a substantially circular cross-section;

providing a plurality of substantially planar electronics cards adapted to control or operate devices in the subsea electronics module;

arranging the plurality of electronics cards in a stack within the housing such that major faces of each card are oriented substantially parallel to, and coaxial with, major faces of the other cards in the stack, each the plurality of electronics cards including a first Ethernet component and a first Ethernet interface for coupling with a first ESB on a substantially planar Ethernet switchblade (ESB) card and including a second Ethernet component and a second Ethernet interface for coupling with a second ESB on the ESB card;

establishing a first and a second local area network (LAN) to enable communication within the subsea electronic module, the step of establishing including the step of providing the ESB card, the ESB card comprising the first ESB configured to provide for control of traffic on the first LAN and the second ESB configured to provide for control of traffic on the second LAN;

positioning the ESB card in a space between said stack of electronics card and an inner surface of the elongate main body of said housing, ESB card being oriented relative to the stack such that its major faces are oriented substantially parallel to a main axis of the stack and orthogonal to the orientation of the major faces of the electronics cards within the stack, thereby minimizing distance between the ESB card and each of the plurality of electronics cards and providing enhanced thermal management;

capacitively coupling the first Ethernet component on each respective one of the plurality of electronics cards with the first ESB;

capacitively coupling the second Ethernet component on each respective one of the plurality of electronics cards with the second ESB;

managing and routing traffic on the first LAN using the first ESB; and managing and routing traffic on the second LAN using the second ESB.

19. A method as defined in claim 18, wherein each electronics card includes a single board computer (SBC), wherein each SBC interfaces with both the first LAN and the second LAN, wherein each electronics card includes a first LAN port associated with a first capacitor device, providing capacitive coupling to the first ESB, and includes a second LAN port associated with a second capacitive device, providing capacitive coupling to the second ESB, the method further comprising the step of:

processing traffic received through the first LAN port of each respective electronics card separately from traffic received through the second LAN port.

20. A method as defined in claim 19, wherein the ESB card includes a first plurality of capacitive devices being connected with the first ESB, providing capacitive coupling to a corresponding plurality of the electronics cards in the stack, and a second plurality of capacitive devices being connected with the second ESB, providing capacitive coupling to the corresponding plurality of electronics cards in the stack.

21. A method as defined in claim 18, wherein the ESB card includes a first plurality of capacitive devices being connected with the first ESB, providing capacitive coupling to a corresponding plurality of the electronics cards in the stack, and a second plurality of capacitive devices being connected with the second ESB, providing capacitive coupling to the corresponding plurality of electronics cards in the stack.

* * * * *